United States Patent
Ganesan et al.

(10) Patent No.: US 10,521,199 B2
(45) Date of Patent: Dec. 31, 2019

(54) SYSTEM AND METHOD FOR DEVELOPING MOBILE BASED APPLICATIONS USING MODEL DRIVEN DEVELOPMENT

(71) Applicant: Tata Consultancy Services Limited, Mumbai (IN)

(72) Inventors: Natarajan Ganesan, Pune (IN); Supriya M, Bangalore (IN); Subbarao Siram, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 159 days.

(21) Appl. No.: 15/456,230

(22) Filed: Mar. 10, 2017

(65) Prior Publication Data
US 2017/0262264 A1  Sep. 14, 2017

(30) Foreign Application Priority Data

Mar. 11, 2016  (IN) .............................. 201621008617

(51) Int. Cl.
*G06F 9/44* (2018.01)
*G06F 8/35* (2018.01)
*G06F 8/36* (2018.01)
*G06F 8/61* (2018.01)

(52) U.S. Cl.
CPC ................. *G06F 8/35* (2013.01); *G06F 8/36* (2013.01); *G06F 8/61* (2013.01)

(58) Field of Classification Search
CPC ..................................... G06F 8/34; G06F 8/61
See application file for complete search history.

(56) References Cited

U.S. PATENT DOCUMENTS

| | | | |
|---|---|---|---|
| 7,047,518 B2* | 5/2006 | Little ........................ | G06F 8/10 717/104 |
| 8,261,231 B1 | 9/2012 | Hirsch et al. | |
| 8,813,028 B2* | 8/2014 | Farooqi ..................... | G06F 8/34 717/107 |
| 9,038,017 B2* | 5/2015 | Premkumar ............... | G06F 8/24 715/763 |
| 2006/0253830 A1* | 11/2006 | Rajanala .................... | G06F 8/36 717/105 |
| 2009/0031226 A1* | 1/2009 | Zhang ........................ | G06F 8/34 715/762 |
| 2009/0254912 A1* | 10/2009 | Roundtree ................. | G06F 8/61 718/102 |
| 2009/0313599 A1* | 12/2009 | Doddavula ............... | G06F 8/10 717/102 |

(Continued)

*Primary Examiner* — Duy Khuong T Nguyen
(74) *Attorney, Agent, or Firm* — Finnegan, Henderson, Farabow, Garrett & Dunner LLP (57) ABSTRACT

A method and system is provided for developing a mobile based application using a model driven development (MDD) approach. The system includes a meta-modelling module to capture a plurality of requirements from a user. Based on the captured requirements, a user interface modeler design at least one screen for the mobile based application. And, a screen flow modeler designs the navigation between the screens. Based on the selected technology platform by the user, the system generates a code for that particular technology platform using a code generator module. And finally, the generated code is bundled using a mobile application bundling module for one or more technology platforms.

7 Claims, 4 Drawing Sheets

(56) References Cited

U.S. PATENT DOCUMENTS

| | | | |
|---|---|---|---|
| 2010/0199261 A1* | 8/2010 | Shenfield | G06F 8/20 717/107 |
| 2010/0287528 A1* | 11/2010 | Lochmann | G06F 8/24 717/104 |
| 2016/0139888 A1* | 5/2016 | Iyer | G06Q 10/0633 717/105 |

* cited by examiner

SYSTEM AND METHOD FOR DEVELOPING MOBILE BASED APPLICATIONS USING MODEL DRIVEN DEVELOPMENT

CROSS-REFERENCE TO RELATED APPLICATIONS AND PRIORITY

The present application claims priority from Indian Application no. 201621008617filed on 11 Mar. 2016, the complete disclosure of which, in its entirety is herein incorporated by references.

TECHNICAL FIELD

The present application generally relates to the field of mobile based application development. More particularly, the application provides a method and system for developing a mobile based application using a model driven development approach.

BACKGROUND

Mobile devices are becoming the most indispensable computing device a person needs. With the advent of smart phones, the mobile phone has become as powerful as any ordinary desktop computer in terms of the applications it can run and its computing power. People are now using their mobile phones not just for calling and sending messages but also for browsing the Internet, playing games, listening to music and various other applications. These applications are normally present in a marketplace, where the user can select the application and install it on the mobile phone or a computer. Everyday a lot of mobile based applications are being developed and are being populated in the marketplace.

One problem about this though is that, developing any type of computer application, whether it is for the desktop computer or mobile device is quite difficult. It still takes a large amount of skill and familiarity with how the framework is used before a person can create a decent amount of code for a simple application. Even setting up the programming environment is a complex task, let alone, trying to figure out how to use the APIs, compiling, running and deploying the application on the actual device. Other things that makes developing applications for mobile devices more difficult as compared to desktop applications are factors such as device limitations (e.g. screen size, computing power, power consumption), different operating systems for mobile devices, different data representation and additional device capabilities (e.g. Bluetooth, Wifi, GPS, Camera enabled) which are not standard to all devices and therefore should be considered when developing a uniform application that can be run on different mobile devices. The artifacts that have been captured for developing web applications cannot be reused and hence substantial effort has to be put for capturing the same requirements into the frameworks for developing mobile applications. In mobile technology platforms, there are regular updates to the technologies. So, the tool or framework has to be changed according to the updates in the target platform and hence maintaining such changes in the tool/framework is difficult. Such tools/frameworks may emit bloated or inefficient code which are against coding standards. Also such tools/frameworks involve substantial learning curve since the mobile application developers may be familiar with such tools platforms is cumbersome.

Further, most of the mobile applications have to be supported on different platforms. Development process for supporting multiple platforms requires more effort and time. Due to increasing requirements managing changes for the same mobile application across different platforms. Moreover, the market does not allow a strategy that restricts app supply to a single platform. Therefore multi-platform app development is a very time and cost-intensive necessity. It demands that apps have to be built more or less from scratch for each and every noteworthy target platform.

Various cross-platform approaches are used when an application has to be developed for several platforms. Popular frameworks for cross-platform app development are currently either based on Web technology or use native components in an interpreting environment. Web-based approaches result in apps that more or less look and behave like Web sites. They are rather mature, but lack a native look & feel. The second achieve an (almost) native look & feel, but all suchlike approaches have severe shortcomings with respect to abstraction level, performance, feature completeness, or bugs.

One of the recent approach which is being used in this field is Model-driven development (MDD) approach. MDD is an approach used in creating complex software systems by first creating a high-level, platform independent model of the system, and then generating a specific code based on the model to the target platform. MDD would greatly help in easing the development process of application development for mobile platforms since it would address the problem of redundancy of tasks in developing an application that would run on several platforms.

Some other researches which applies MDD to ease software development are: the Simple Mobile Services project which applies MDD to the creation of mobile services, PervML which aims to create pervasive systems through the application of MDD, the Multimedia Modeling Language (MML) which is designed for interactive multimedia applications, and other researches applies modeling concepts for creating platform independent user interfaces.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present disclosure provides a system for developing a mobile based application. The system comprises a meta-modelling module, a user interface modeler, a screen flow modeler, an input device, a code generator module and a mobile application bundling module. The meta-modelling module captures a plurality of requirements for the mobile based application. The user interface for designs a plurality of screens of the mobile based application. The plurality of screens is designed based on the plurality of requirements. The screen flow modeler designs navigation between the plurality of screens of the mobile based application. The input device selects a technology platform. The code generator module generates a code depending upon the selected technology platform. The mobile application bundling module develops the mobile based application by bundling the code.

The present disclosure also provides a processor implemented method for developing a mobile based application. Initially a plurality of requirements are captured for developing the mobile based application using a meta-modelling module. In the next step, at least one screen of the mobile based application is designed using a user interface modeler. The screen is designed based on the plurality of requirements. Further, the navigation between the screens of the mobile based application is designed using a screen flow modeler. In the next step, a technology platform is selected using an input device. Later, a code depending upon the selected technology platform is generated using a code generator module. And finally, the mobile based application is developed by bundling the code using a mobile application bundling module.

In another embodiment, a non-transitory computer-readable medium having embodied thereon a computer program for developing a mobile based application. Initially a plurality of requirements are captured for developing the mobile based application using a meta-modelling module. In the next step, at least one screen of the mobile based application is designed using a user interface modeler. The screen is designed based on the plurality of requirements. Further, the navigation between the screens of the mobile based application is designed using a screen flow modeler. In the next step, a technology platform is selected using an input device. Later, a code depending upon the selected technology platform is generated using a code generator module. And finally, the mobile based application is developed by bundling the code using a mobile application bundling module.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store)

programs and data to, a non-transitory computer-readable storage medium such as an internal disk (not shown) or a removable disk.

Figure 1:
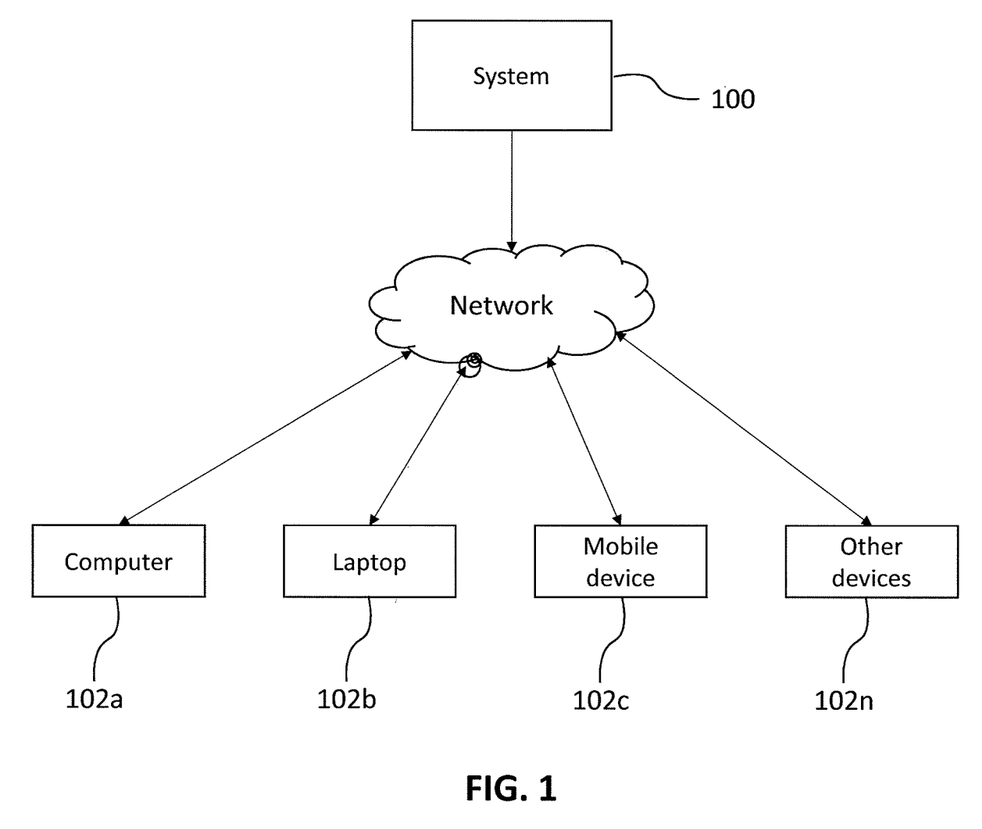
FIG. 1 shows a network implementation of a system for developing a mobile based application using model driven development in accordance with an embodiment of the disclosure.
Figure 2:
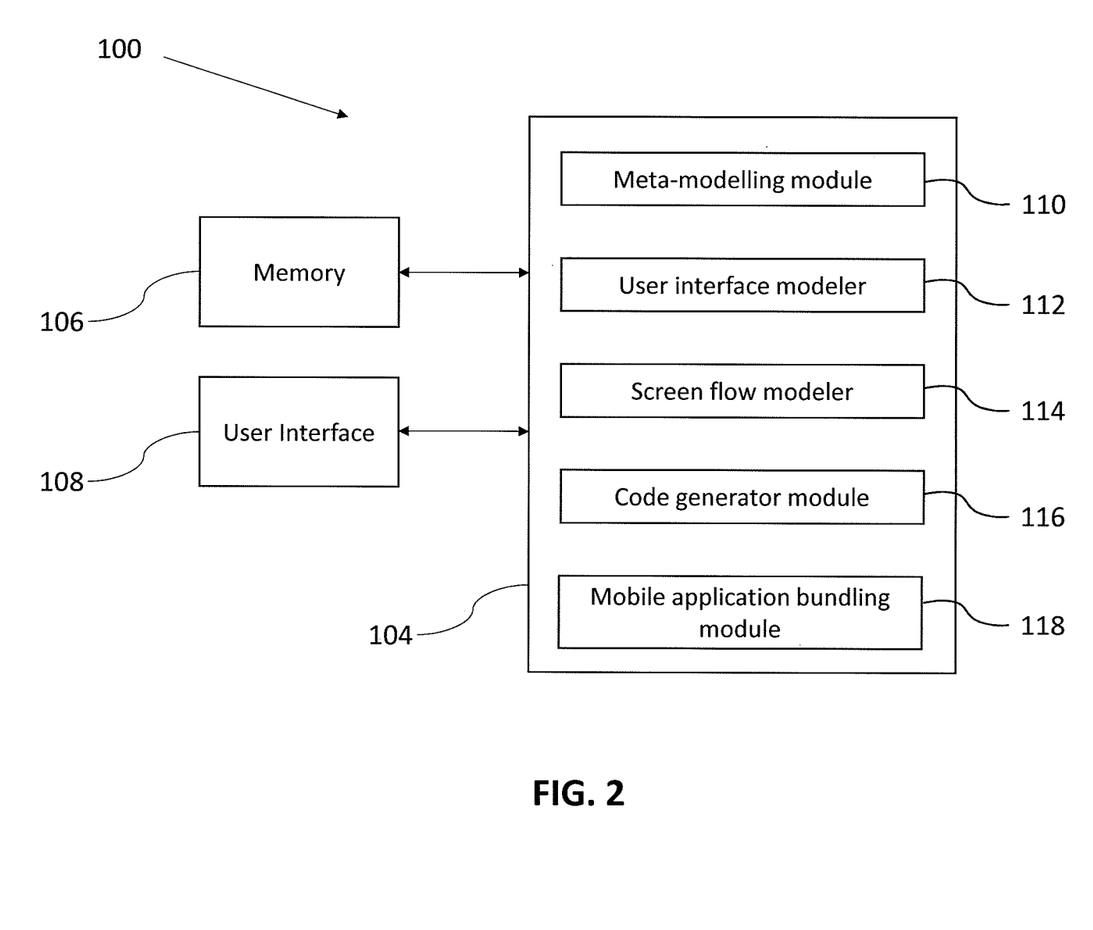
FIG. 2 shows a block diagram of a system for developing a mobile based application using model driven development in accordance with an embodiment of the disclosure.

A network implementation of a system 100 for developing a mobile based application using a model driven development (MDD) methodology is shown in FIG. 1 and FIG. 2 according to an embodiment of the disclosure. The system 100 provides a framework which can be used to build mobile applications irrespective of platform. The system uses model driven development which helps in capturing requirements for mobile based applications. The models developed in this approach are configurable, scalable according to the requirements. The system 100 can be used to generate mobile applications for different technology platforms without any changes in the model using code generator frameworks which can be configured according to the required technology platform. In another embodiment of the disclosure, the mobile based application can also be used on the web technology.

Although the present disclosure is explained considering that the system 100 is implemented on a server, it may be understood that the system 100 may also be implemented in a variety of computing systems, such as a laptop computer, a desktop computer, a notebook, a workstation, a mainframe computer, a server, a network server, a cloud-based computing environment as shown in FIG. 1. It will be understood that the system 100 may be accessed by multiple users through one or more user devices 102-1, 102-2 . . . 102-N, collectively referred to as user 102 hereinafter, or applications residing on the user devices 102. In one implementation, the system 100 may comprise the cloud-based computing environment in which a user may operate individual computing systems configured to execute remotely located applications. Examples of the user devices 102 may include, but are not limited to, a portable computer, a personal digital assistant, a handheld device, and a workstation. The user devices 102 are communicatively coupled to the system 100 through a network.

Referring to FIG. 2, according to an embodiment of the disclosure, the system 100 comprises a processor 104, a memory 106 and a user interface 108 or an input device 110. The processor 104 further comprises a plurality of modules for performing various functions. The plurality of modules access algorithm stored in the memory 106 to execute the program. The plurality of modules further include modules such as a meta-modelling module 110, a user interface modeler 112, a screen flow modeler 114, a code generator module 116 and a mobile application bundling module 118.

According to an embodiment of the disclosure, the user interface 108 may include a variety of software and hardware interfaces, for example, a web interface, a graphical user interface, and the like. The I/O interface user may allow the system 100 to interact with the user directly or through the client devices 102. Further, the user interface 108 may enable the system 100 to communicate with other computing devices, such as web servers and external data servers (not shown). The user interface 108 can facilitate multiple communications within a wide variety of networks and protocol types, including wired networks, for example, LAN, cable, etc., and wireless networks, such as WLAN, cellular, or satellite. The user interface 108 may include one or more ports for connecting a number of devices including assistive technology devices or adaptive products used by people with disability to one another or to another server.

According to an embodiment of the disclosure, a plurality of requirements for the mobile based application is captured using the meta-modelling module 110. In an example, the plurality of requirements are chosen in such a way that it should represent the business need of the user instead of the technological need. By providing the business need, it is easier to adopt as compared to other tools or frameworks. It should be appreciated that the plurality of requirements for the mobile based application are chosen such a way that the same models can be used for web based as well as mobile based applications. In another example, an additional interviews with developers and managers can also be conducted to list the plurality of requirements typically required of applications in the context of present disclosure. In a top down approach, the features of MDD from this list by prioritizing the most-often found requirements. Only then these features were reconciled with those provided by today's mobile devices to ensure the practicability of this approach.

According to an embodiment of the disclosure the user interface modeler 112 designs a plurality of screens of the mobile based application. The plurality of screens is designed based on the captured plurality of requirements. This provides the capability to the user to model controls and configure them according to business requirements. The user interface modeler 112 designs various structures such as screens, screen flows, events etc.

Figure 3:
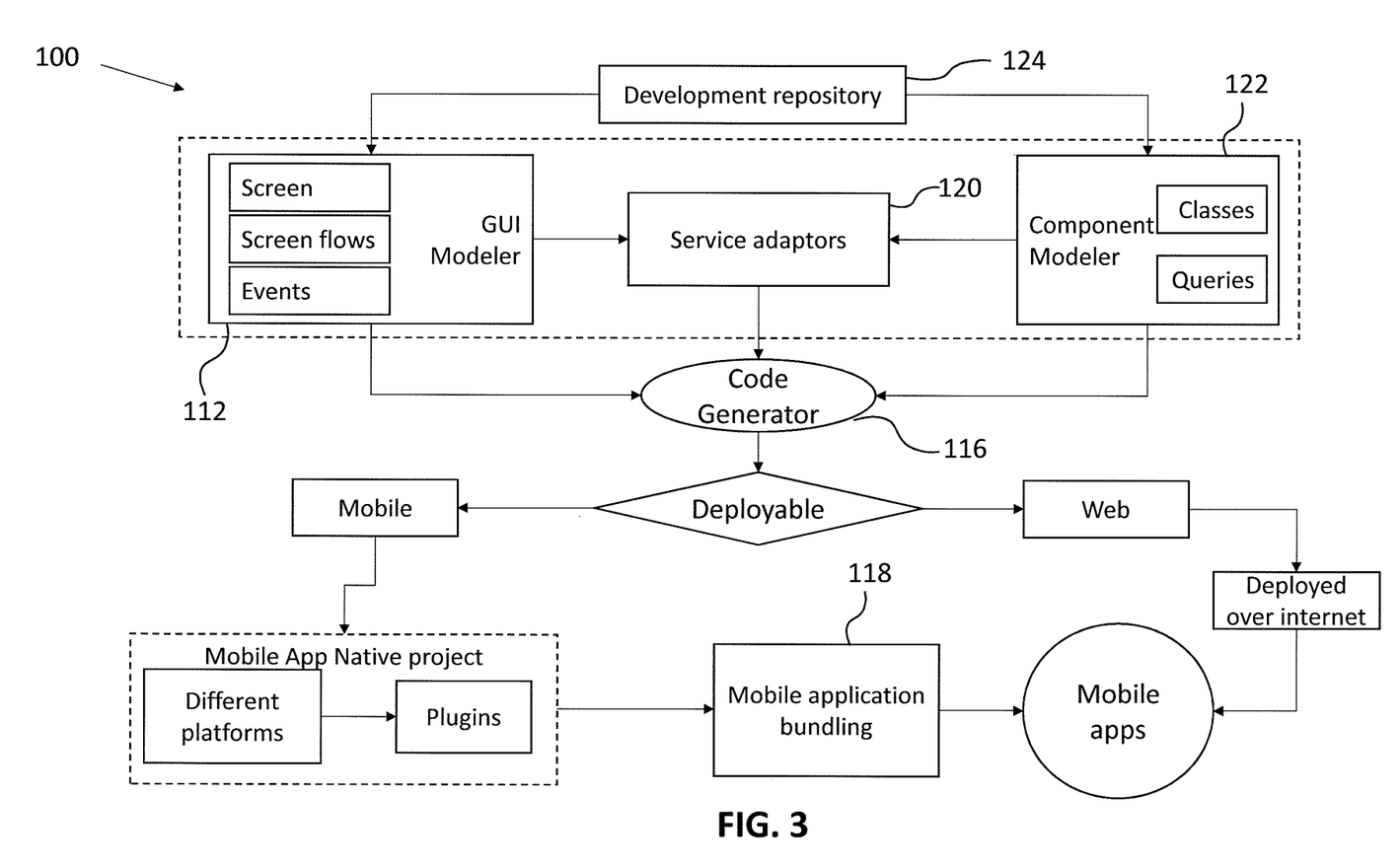
FIG. 3 shows a schematic representation of the system for developing a mobile based application using model driven development in accordance with an embodiment of the disclosure.

According to an embodiment of the disclosure, the screen flow modeler 114 designs navigation between the screens of the mobile based application. The navigation of the plurality of screens is also done depending on the captured plurality of requirements. In an embodiment the plurality of screens can be mapped with a set of backend stubs using a service adaptor 120 or a service mapper 120 as shown in FIG. 3. The service adaptor 120 automatically retrieves the backend data for further use. The service adaptors 120 receives input from the user interface modeler 112 and a component modeler 122. The component modeler 122 is configured create the set of backend stubs for serving data for the user interface of the mobile.

According to an embodiment of the disclosure a technology platform is selected using the user interface 108. In an example, the technology platform can be selected from one of a Android, iOS, Windows, Symbian, Blackberry platform etc. Moreover, the examples of these are the Symbian operating system C++API2, Java platform micro edition (Java ME) API3 from Sun Microsystems, the Android API4 from the Open Handset Alliance and the iPhone API from Apple.

According to an embodiment of the disclosure, the code generator module 116 generates a code depending upon the selected technology platform. Since the system is based on model driven development, the code generated by the code generator module ensures proper architecture and standards in the generated code so that the code is in line with the code conventions. The responsibility of the code generator module 116 is to create the source code of the application out of the preprocessed model.

According to an embodiment of the disclosure, the system 100 also includes a development repository 124. The development repository 124 is a kind of database for storing the plurality of source codes. The plurality of source codes are stored in a platform independent manner. The development repository 124 helps users to create the set of backend stubs or structures. In an embodiment, the set of backend stubs can be created by the component modeler 122. The development repository 124 can be configured to provide complete implementation of the set of backend stubs based on the plurality of requirements. It should be appreciated that the development repository 124 can also be connected with a backend database.

According to an embodiment of the disclosure, the generated code is then bundled using the mobile application bundling module 118 to develop the mobile based application. The bundling of the code results in generation of an installable mobile application of cross platform. The models thus designed are independent of any technology platform thus ensuring platform retarget ability of the system 100. The generated code must be compliable to a native application without modification and the suchlike packaged application must be directly installable and runnable on the respective mobile platform. This requires transforming the declarative model written in MDD language into source code according to the target SDK. It should be appreciated that the mobile application bundling module 118 is further configured to develop the mobile based applications with a responsive screen layout.

Figure 4:
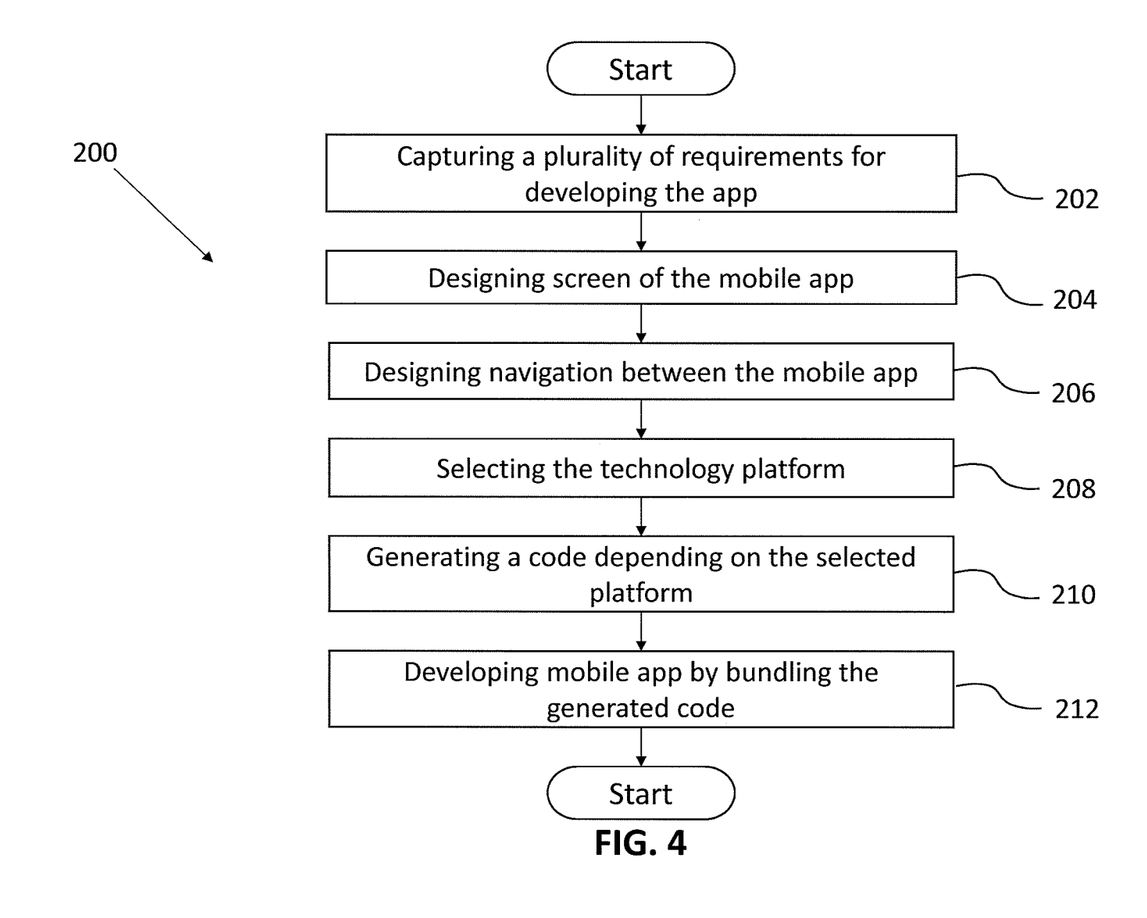
FIG. 4 shows a flowchart illustrating a method for developing a mobile based application using model driven development in accordance with an embodiment of the disclosure.

In operation, a flowchart 200 illustrating steps involved in developing the mobile based application is shown in FIG. 4, according to an embodiment of the disclosure. Initially at step 202, a plurality of requirements for developing the mobile based application are captured using the meta-modelling module 110. The plurality of requirements are captured in terms of business requirement of the user. In the next step 204, at least one screen of the mobile based application is designed using the user interface modeler 112. The screen is designed based on the plurality of requirements captured in the previous step. At step 206, the navigation between the screens of the mobile based application are designed using the screen flow modeler 114. At step 208, a technology platform is selected using the input device 108 or the user interface 108. The technology platform can be one of a Symbian, iOS, Windows, Android or a Blackberry platform. At step 210, a code is generated depending upon the selected technology platform using the code generator module 116. And finally at step 212, the mobile based application is developed by bundling the code using the mobile application bundling module 118.

According to various embodiment of the disclosure, the system also provides various advantages as follows: The system is not dependent on the technical expertise to generate the mobile based application. Moreover, the MDD approach results in reduction of overall cost incurred. Moreover, the code is also improved as compared to the prior art method. In addition to that, the mobile based application can be developed in the lesser turnaround time as compared to the existing methods.

In view of the foregoing, it will be appreciated that the present disclosure provides a method and system for developing the mobile based application using a model driven development approach. The preceding description has been presented with reference to various embodiments. Still, it should be understood that the foregoing relates only to the exemplary embodiments of the present invention, and that numerous changes may be made thereto without departing from the spirit and scope of the invention as defined by the following claims.

What is claimed is:

1. A system for developing a mobile based application, the system comprising:
    a meta modelling module, executed by a processor, for capturing a plurality of requirements for the mobile based application, wherein the captured plurality of requirements represent at least one business requirement of a user;
    a user interface modeler, executed by the processor, for designing a plurality of screens of the mobile based application, wherein the plurality of screens is designed based on the plurality of requirements;
    a service adaptor for mapping the plurality of screens with a set of backend stubs, wherein the service adaptor receives input from the user interface modeler and uses a component modeler, executed by the processor, and wherein the component modeler is configured to create the set of backend stubs for serving data for the user interface of the mobile;
    a screen flow modeler, executed by the processor, for designing navigation between the plurality of screens of the mobile based application, wherein the navigation of the plurality of screens is based on the plurality of requirements;
    an input device for selecting a technology platform;
    a code generator module, executed by the processor, for generating a code depending upon the selected technology platform; and
    a mobile application bundling module, executed the processor, configured to bundle the generated code to develop the mobile based application with a responsive screen layout, wherein the bundling result in generation of an installable mobile based application of cross platform.

2. The system of claim 1, wherein the mobile based application is configured to be used on one of a web based or a mobile based platform.

3. The system of claim 1, further includes a development repository for storing a plurality of codes in a platform independent manner.

4. The system of claim 1, further configured to generate code for a plurality of mobile technologies.

5. The system of claim 1, wherein the code generated by the code generator module is in line with a predefined code convention.

6. A processor-implemented method for developing a mobile based application, the method comprising:
    capturing a plurality of requirements for developing the mobile based application, wherein the captured plurality of requirements represent at least one business requirement of a user;
    designing at least one screen of the mobile based application, wherein the screen is designed based on the plurality of requirements;
    mapping the at least one screen with a set of backend stubs, wherein the mapping further comprises receiving input from a user interface and creating the set of backend stubs for serving data for the user interface of the mobile;
    designing navigation between the screens of the mobile based application, wherein the navigation of the screens is based on the plurality of requirements;
    selecting a technology platform using an input device;
    generating a code depending upon the selected technology platform; and
    bundling the generated code for developing the mobile based application with a responsive screen layout, wherein the bundling result in generation of an installable mobile based application of cross platform.

7. A non-transitory computer-readable medium having embodied thereon a computer program for developing a mobile based application, the method comprising:

capturing a plurality of requirements for developing the mobile based application, wherein the captured plurality of requirements represent at least one business requirement of a user;

designing at least one screen of the mobile based application, wherein the screen is designed based on the plurality of requirements;

mapping the at least one screen with a set of backend stubs, wherein the mapping further comprises receiving input from a user interface and creating the set of backend stubs for serving data for the user interface of the mobile;

designing navigation between the screens of the mobile based application, wherein the navigation of the screens is based on the plurality of requirements;

selecting a technology platform using an input device;

generating a code depending upon the selected technology platform; and bundling the generated code for developing the mobile based application with a responsive screen layout, wherein the bundling result in generation of an installable mobile based application of cross platform.

\* \* \* \* \*